(12) United States Patent
Shimizu et al.

(10) Patent No.: US 9,268,138 B2
(45) Date of Patent: Feb. 23, 2016

(54) HEAD-MOUNTED DISPLAY

(75) Inventors: Masayuki Shimizu, Kanagawa (JP); Tatsuya Narahara, Kanagawa (JP)

(73) Assignee: SONY CORPORATION, Tokyo (JP)

(*) Notice: Subject to any disclaimer, the term of this patent is extended or adjusted under 35 U.S.C. 154(b) by 1097 days.

(21) Appl. No.: 13/334,460

(22) Filed: Dec. 22, 2011

(65) Prior Publication Data
US 2012/0169725 A1 Jul. 5, 2012

(30) Foreign Application Priority Data
Dec. 29, 2010 (JP) .............................. P2010-294455

(51) Int. Cl.
*G02B 27/01* (2006.01)
(52) U.S. Cl.
CPC .......... *G02B 27/0172* (2013.01); *G02B 27/017* (2013.01); *G02B 2027/0123* (2013.01); *G02B 2027/0127* (2013.01); *G02B 2027/0134* (2013.01)
(58) Field of Classification Search
CPC ................................................. G02B 27/0172
See application file for complete search history.

(56) References Cited

U.S. PATENT DOCUMENTS

| | | |
|---|---|---|
| 6,243,207 B1 | 6/2001 | Kawamura et al. |
| 2010/0290127 A1* | 11/2010 | Kessler et al. ............ 359/631 |

FOREIGN PATENT DOCUMENTS

| | | | |
|---|---|---|---|
| DE | 102005007838 A1 | 8/2006 | |
| EP | 0643314 B1 | 3/2000 | |
| EP | 0617549 B1 | 8/2002 | |
| JP | 8082762 | 3/1996 | |
| JP | H08-082762 A | 3/1996 | |
| JP | 10153749 | 6/1998 | |
| JP | H10-153749 A | 6/1998 | |
| JP | 10188034 | 7/1998 | |
| JP | H10-188034 A | 7/1998 | |
| JP | 11-133315 A | 5/1999 | |
| JP | 11133315 | 5/1999 | |
| JP | 2007-133415 | * 5/2007 | ............ G02B 27/02 |
| JP | 2007-133415 A | 5/2007 | |
| JP | 2010-021731 A | 1/2010 | |
| WO | 2004/029693 A1 | 4/2004 | |
| WO | 2004029693 A1 | 4/2004 | |

OTHER PUBLICATIONS

Partial European Search Report EP 11187424, dated May 14, 2012.
Office Action from Japanese Application No. 2010-294455, dated Jun. 17, 2014.
European Search Report EP 11187424, dated Jul. 25, 2012.
Office action received for Japanese application No. 2010-294455, mailed on Dec. 9, 2014.

* cited by examiner

*Primary Examiner* — Sath V Perungavoor
*Assistant Examiner* — James Pontius
(74) *Attorney, Agent, or Firm* — Hazuki International, LLC (57) ABSTRACT

A head-mounted display includes a left-eye display panel that displays a left-eye image, a left-eye optical system that has an angle of view from 45 to 55 degrees and forms a virtual image of the left-eye image, a right-eye display panel that displays a right-eye image, a right-eye optical system that has an angle of view from 45 to 55 degrees and forms a virtual image of the right-eye image, and a display control unit that controls the screen display of the left-eye display panel and the right-eye display panel.

8 Claims, 10 Drawing Sheets

HEAD-MOUNTED DISPLAY

CROSS-REFERENCE TO RELATED APPLICATION

The present application claims priority from Japanese Patent Application No. JP 2010-294455 filed in the Japanese Patent Office on Dec. 29, 2010, the entire content of which is incorporated herein by reference.

BACKGROUND

The present disclosure relates to a head-mounted display mounted on the head of the user to provide a virtual image and, more particularly, to a head-mounted display that provides a virtual image letting the user experience the same realism as in the best seat in a movie theater.

A 3D image which can be stereoscopically viewed can be provided for an observer by displaying images having parallax on right and left eyes of the observer. It has been expected that a 3D image technique is applied to various fields such as television broadcast, films, telecommunication, and telemedicine. For example, a time-division stereoscopic image display system that has a combination of a display device and 3D eyeglasses has already been widespread (For example, refer to Japanese Unexamined Patent Application Publication No. 2010-21731). The display device alternately displays a left-eye image and a right-eye image that have parallax on a screen in a particularly short cycle. The 3D eyeglasses have shutter mechanisms which are liquid crystal lenses, for example, and provided for a left-eye part and a right-eye part respectively.

A display device that the user wears on his or her head to see a video image, namely, a head-mounted display (HMD) has been widespread. A head-mounted display includes a display device for each of left and right eyes and is used with a headphone so that senses of sight and hearing can be controlled. If the head-mounted display is configured so as to completely block external environments when it is mounted on a head, a sense of virtual reality in watching is increased. The head-mounted display can project different video images to left and right eyes. If images having parallax are displayed on left and right eyes, a 3D image can be provided in the same way as above.

A head-mounted display is a display system that provides the user with a virtual image (that is, a virtual image is focused on the retina). When an object is present in a position closer to the lens than the focal point, a virtual image appears on the object side.

When the user sees a virtual image, it is preferable, for example, to change the distance between the user and the point where a virtual image is formed, depending on the video image. For example, a display device that provides a virtual image appropriate for the video image is proposed (see Japanese Unexamined Patent Application Publication No. 2007-133415, for example). This display device has a magnifying optical system that places the same virtual image observed by the left and right eyes of the user on a single plane, and controls the distance between the user and the virtual image and the magnification of the virtual image depending on the aspect ratio of the video image. For example, for the video image of a movie or drama with a aspect ratio of 16 to 9 based on high definition broadcast, a large virtual image at a far position approximately 15 meters away from the user is focused on the retina. For the video image including television signals with a aspect ratio of 4 to 3 based on the NTSC (National Television System Committee) system, a middle virtual image at a relatively close position approximately 3 meters from the user is focused on the retina to let the user experience realism and reduce tiredness during seeing of the virtual image.

If a device with high resolution such as organic electro-luminescence (EL) is used as the display units of the left and right eyes of the head-mounted display, an adequate field angle is set by an optical system, and multichannel is reproduced by the headphone, then the same realism as in the best seat in a movie theater can be reproduced. The inventors are going to develop a head-mounted display that provides the same audio-visual environment as in the best seat in a movie theater.

In a product of the related art, an approximately 60-inch virtual image approximately several meters away is focused on the retina and the angle of view is a little under 40 degrees. When this situation is thought in terms of a movie theater, a seat several meters away from the screen is not a good seat and this angle of view is not large enough for movie appreciation. On the other hand, if the angle of view is too large, the user should move the face when reading a caption displayed near an end of the screen, so this situation is not appropriate for movie appreciation.

SUMMARY

It is desirable to provide an outstanding head-mounted display that is mounted on the head of the user to give a preferable virtual image.

It is also desirable to provide an outstanding head-mounted display that provides a virtual image letting the user experience the same realism as in the best seat in a movie theater.

According to a first embodiment of the present disclosure, there is provided a head-mounted display including a left-eye display panel that displays a left-eye image, a left-eye optical system that has an angle of view from 45 to 55 degrees and forms a virtual image of the left-eye image, a right-eye display panel that displays a right-eye image, a right-eye optical system that has an angle of view from 45 to 55 degrees and forms a virtual image of the right-eye image, and a display control unit that controls the screen display of the left-eye display panel and the right-eye display panel.

According to a second embodiment of the present disclosure, the left-eye optical system of the head-mounted display of the first embodiment forms an approximately 750-inch magnified virtual image of the left-eye image 10 meters or more away from a left eye, and the right-eye optical system forms an approximately 750-inch magnified virtual image of the right-eye image 10 meters or more away from a right eye.

According to a third embodiment of the present disclosure, each of the left-eye optical system and the right-eye optical system of the head-mounted display of the first embodiment has substantially even resolving power in a range of displacement with respect to a corresponding eyeball.

According to a fourth embodiment of the present disclosure, the left-eye display panel of the head-mounted display of the first embodiment is disposed in a location displaced by a predetermined convergence horizontal offset from the position of a left eyeball and the right-eye display panel is disposed in a location displaced by a predetermined convergence horizontal offset from the position of a right eyeball.

According to a fifth embodiment of the present disclosure, in the head-mounted display of the fourth embodiment, the convergence horizontal offset is set on the basis of a maximum interpupillary distance and the ratio of the size of the left-eye display panel and right-eye display panel to the size of a surface on which the virtual image is focused.

According to a sixth embodiment of the present disclosure, in the head-mounted display of the fifth embodiment, the left-eye display panel is disposed in the location displaced by the predetermined convergence horizontal offset and the right-eye display panel is disposed in the location displaced by the predetermined convergence horizontal offset with a positional accuracy of several microns or less.

According to the embodiments of the present disclosure, it is possible to provide an outstanding head-mounted display that reproduces a virtual image letting the user experience the same realism as in the best seat in a movie theater.

According to the first or second embodiment of the present disclosure, the head-mounted display can focus an approximately 750-inch magnified virtual image 20 meters away from the user's eyes and provide a stereoscopic video image letting the user experience the same realism as in the best seat in a movie theater.

According to the third embodiment of the present disclosure, the head-mounted display can provide a virtual image with certain resolving power even if the eyeballs turn and the positions of the pupils are displaced from the optical system because the user changes the point in the virtual image to be seen.

According the fourth embodiment of the present disclosure, when both eyes of the user observing a video image on the head-mounted display move closer to each other depending on the angle of view, the left-eye and right-eye display panels are displaced by a predetermined convergence horizontal offset in order to get the optimum parallax.

According the fifth embodiment of the present disclosure, the convergence horizontal offset by which the left-eye and right-eye display panels are displaced can be determined on the basis of the maximum interpupillary distance and the ratio of the size of the left-eye and right-eye display panels to the size of a surface on which the virtual image is focused.

According the sixth embodiment of the present disclosure, the left-eye display panel and the right-eye display panel are disposed in the location displaced by the predetermined convergence horizontal offset with a positional accuracy of several microns or less, so that the image quality can be kept and tiredness of the user observing the virtual image can be reduced.

Other purposes, features, and advantages of the embodiments of the present disclosure will be clear by the later-described embodiment of the present disclosure and further detailed description based on the accompanying drawings.

DETAILED DESCRIPTION OF EMBODIMENTS

An embodiment of the present disclosure will now be described with reference to the drawings.

Figure 1:
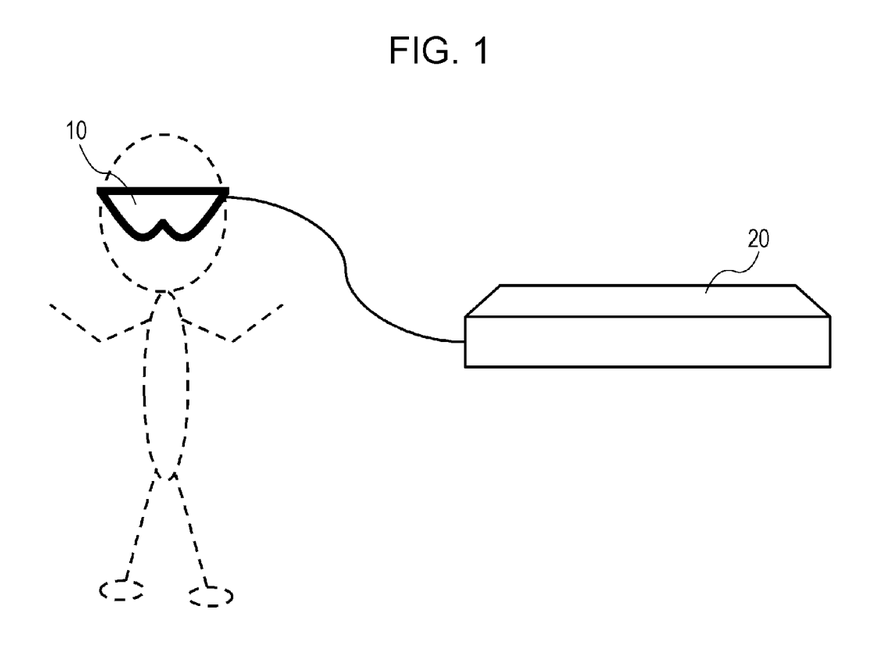
FIG. 1 schematically illustrates the structure of an image display system including a head-mounted display.

FIG. 1 schematically shows the structure of an image display system including a head-mounted display. The image display system shown in FIG. 1 includes the body of a head-mounted display 10 and a Blu-ray disc reproducing apparatus 20 from which audio-visual contents are sourced.

An HDMI cable is used to connect between the Blu-ray disc reproducing apparatus 20 and the head-mounted display 10 and between a front end box 40 and a high vision display 30. Then, the Blu-ray disc reproducing apparatus 20 reproduces video-audio data recorded in a Blu-ray disc (not shown) inserted and outputs it in the HDMI format. HDMI (high-definition multimedia interface), which is based on DVI (digital visual interface) and uses TMDS (transition minimized differential signaling) as a physical layer, is an interface standard for digital home appliances for mainly transmitting audio and video data. This system conforms to HDMI 1.4, for example. The Blu-ray disc reproducing apparatus 20 may output a reproducing signal to an HDMI television receiver (not shown), but no description is provided because it does not directly relate to the contents of the present disclosure.

The head-mounted display 10 includes a left-eye display unit and a right-eye display unit that are mutually separated. The left-eye display unit and right-eye display unit include organic EL devices, for example. The left-eye display unit and right-eye display unit also include wide viewing angle optical systems with low distortion and high resolution. The head-mounted display 10 obtains driving power through the HDMI cable.

Figure 2:
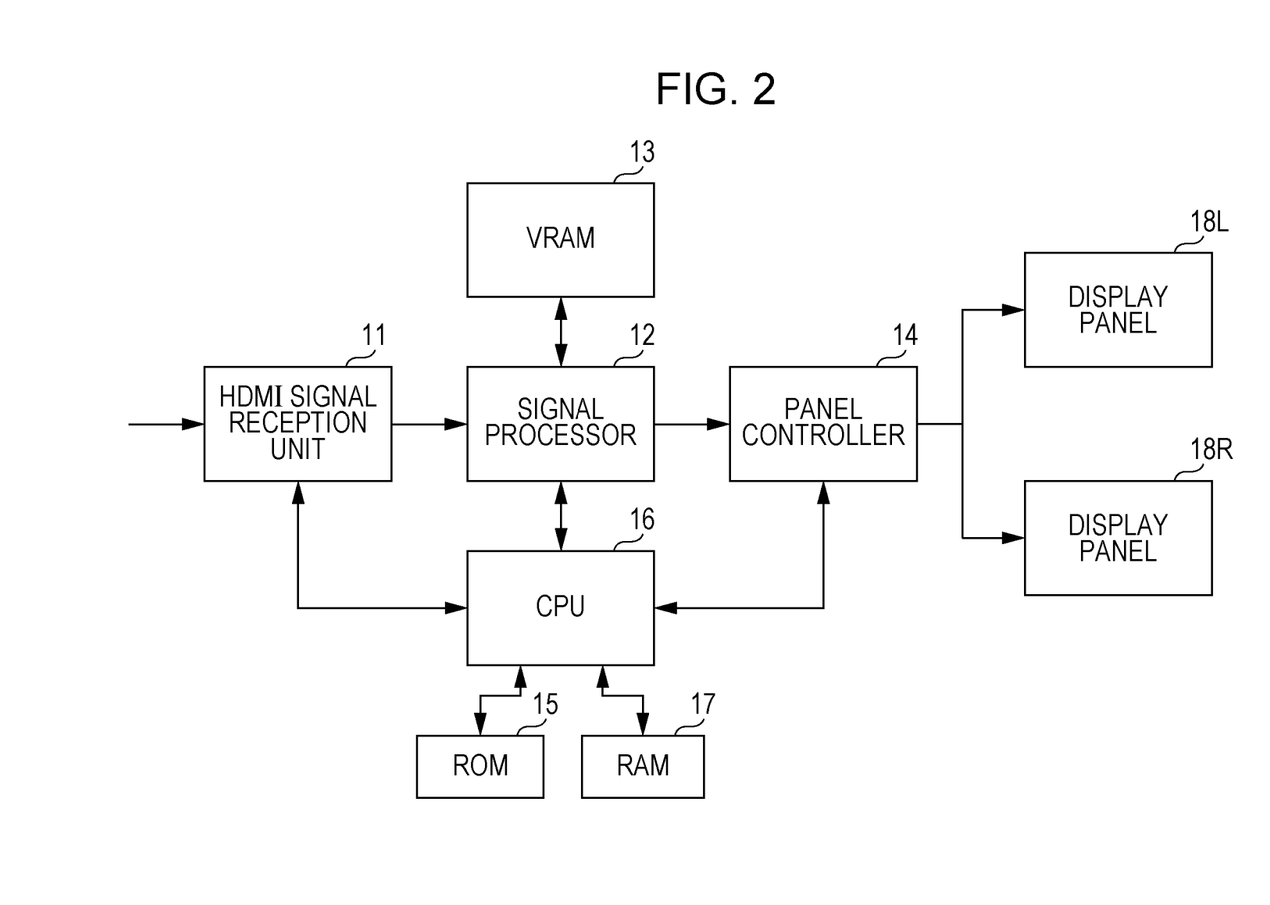
FIG. 2 schematically illustrates the internal structure of the head-mounted display.

FIG. 2 schematically illustrates the internal structure of the head-mounted display 10. The head-mounted display 10 shown in FIG. 2 includes an HDMI signal reception unit 11, a signal processor 12, a VRAM (video RAM) 13, a panel controller 14, a ROM (read only memory) 15, a CPU (central processing unit) 16, a RAM (random access memory) 17, and left-eye and right-eye display panel 18L and 18R. The head-mounted display 10 may include an audio signal processing system and an audio output unit such as a headphone (these components are not shown).

The ROM 15 stores processing programs or data used for processing. The CPU 17 executes a program loaded from the ROM 15 to the RAM 17 and totally controls the operation of the head-mounted display 10.

The HDMI signal reception unit 11 receives an AV signal (for example, a 3D AV signal) via the HDMI cable connected to the front end box 40. The signal processor 12 performs the signal processing of the AV signal received and generates screen information. The screen information generated is temporarily stored in the VRAM (frame memory) 13.

The left-eye and right-eye display panels 18L and 18R include organic EL devices of high resolution. Each of the left-eye and right-eye display panels 18L and 18R is combined with a wide viewing angle optical system to configure left and right display units. The wide viewing angle optical systems are not shown in FIG. 2. The optical characteristics of the wide viewing angle optical systems and the detail of the left-eye and right-eye display panels 18L and 18R corresponding to the wide viewing angle optical systems will be described later.

The panel controller 14 reads screen information from the VRAM 13 at predetermined display intervals and drives the left-eye and right-eye display panels 18L and 18R to display the screen information.

The appearance of the head-mounted display 10 is not shown, but it is similar to eyeglasses for vision correction and includes a main body and left and right temple units (ear hooks). When the user wears the eyeglasses, the main body is placed on the front of the user's face. When the main body is mounted on the head of the user, the temple units for the left ear and the right ear are hooked on both ears.

The main body supports the left and right display units including the left-eye and right-eye display panels 18L and 18R and the corresponding wide viewing angle optical systems and incorporates the electric circuit system shown in FIG. 2. A multi-channel headphone may be connected to each of the left and right temple units.

Nose pads are attached to both sides of the position of the main body with which the user's nose makes contact. When the user wears the head-mounted display 10, the nose pads in contact with the user's nose prevent the main body from slipping down and keep the left and right display units at a preferable height with respect to the left and right eyes.

Figure 3:
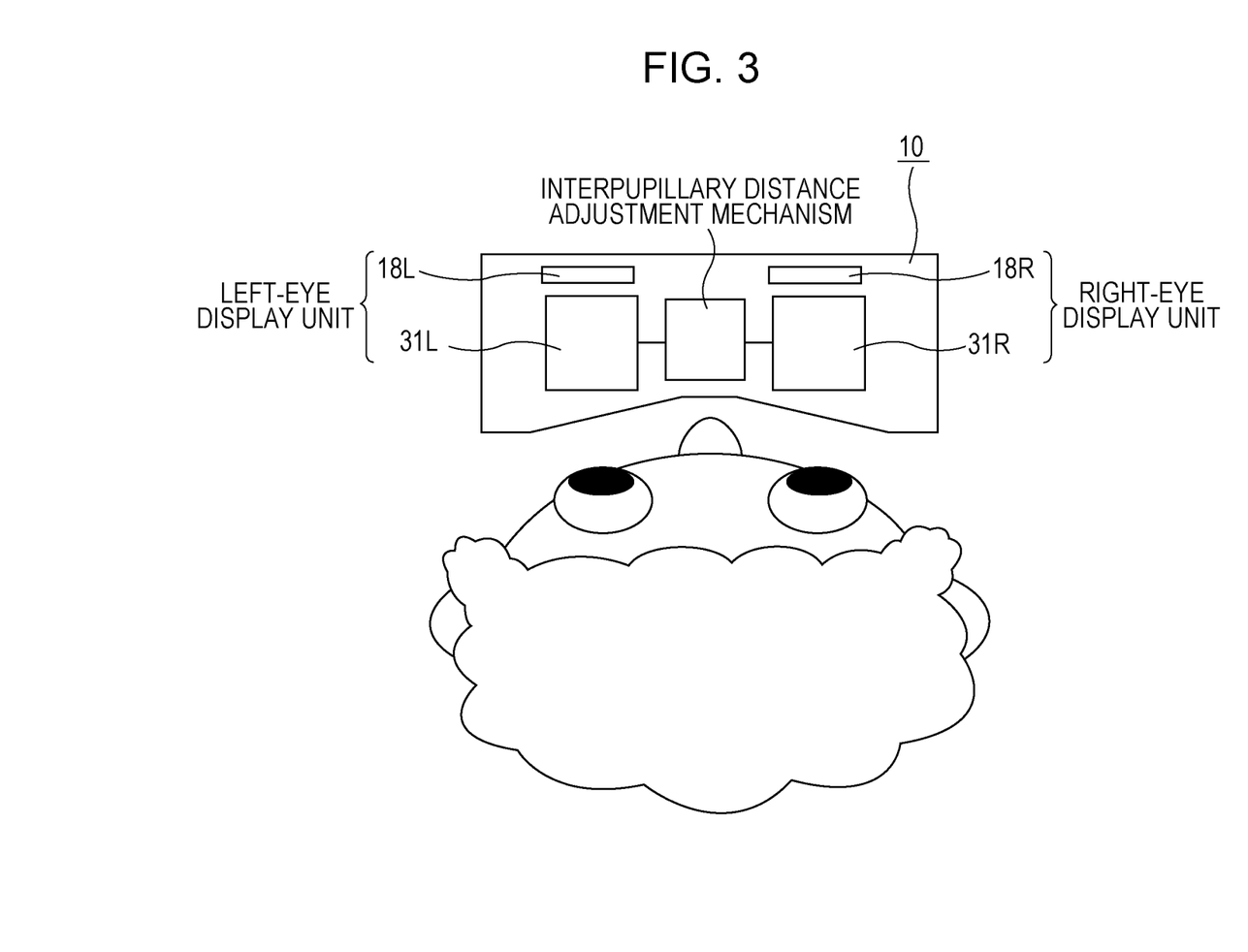
FIG. 3 is a top view illustrating the body of the head-mounted display.

FIG. 3 is a top view illustrating the main body of the head-mounted display 10. The head-mounted display 10 has the left and right wide viewing angle optical systems, which are mutually separated. There are variations among individuals in the height of eyes and the interpupillary distance, so the wide viewing angle optical systems should be aligned with the eyes of the user wearing them. Accordingly, an interpupillary distance adjustment mechanism for adjusting the interpupillary distance is disposed between the right-eye and left-eye display units. The mechanical parts of the interpupillary distance adjustment mechanism may be determined arbitrary.

Figure 4:
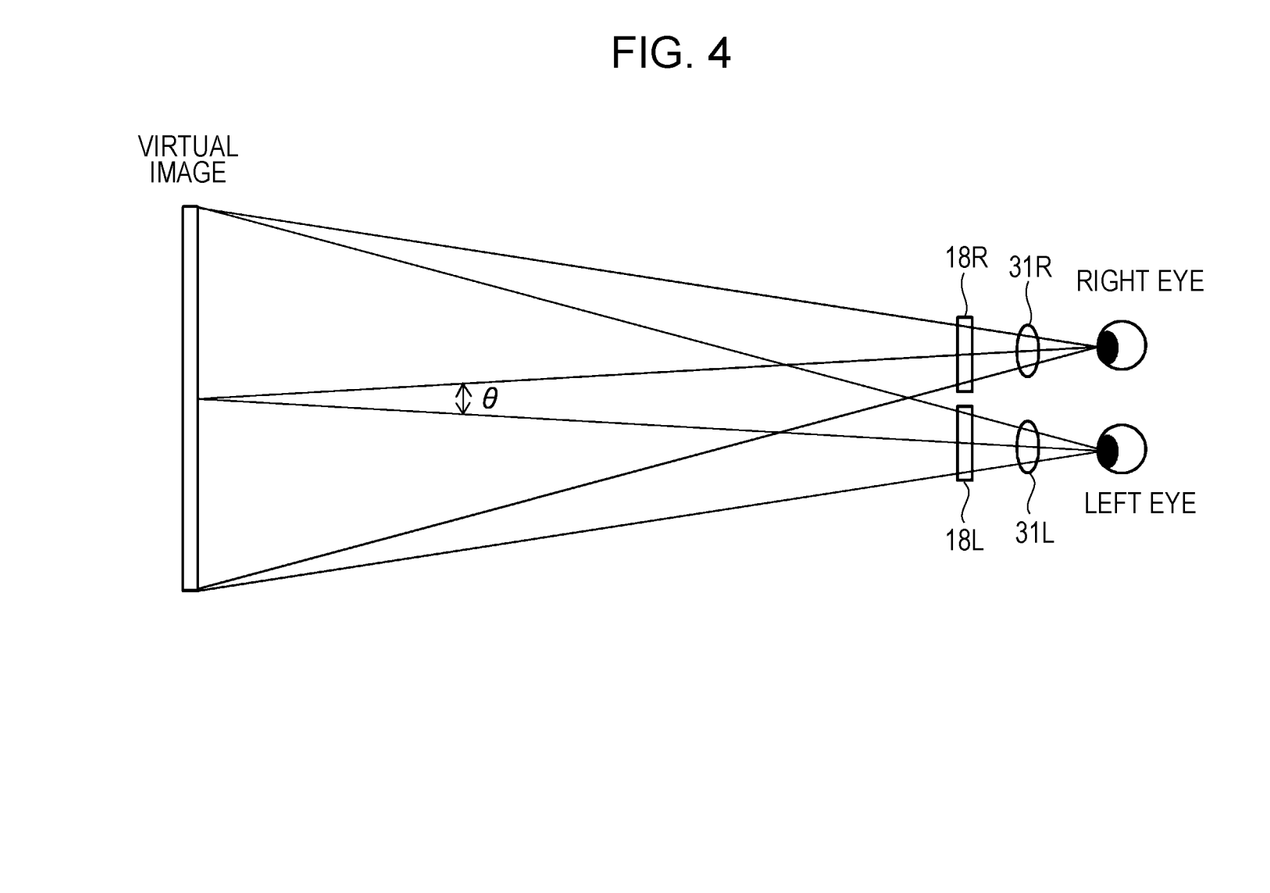
FIG. 4 is illustrates how the head-mounted display displays a virtual image.

How the head-mounted display 10 displays a virtual image will be described with reference to FIG. 4. Left-eye image information and right-eye image information from which a stereoscopic video image is sourced are created in consideration of a predetermined convergence angle (eye close angle). The head-mounted display 10 displays the left-eye image and the right-eye image on separate screens so that the user's eyes can see a stereoscopic image by synthesizing both screens. The images displayed on left-eye and right-eye display panels 18L and 18R become magnified virtual images through wide viewing angle optical systems 31L and 31R. When the virtual images are focused on the retinas of the left and right eyes, they enter the brain as separate information items and combined into one stereoscopic image within the brain. At this time, a certain convergence angle θ that depends on the viewpoint position is given between the left-eye and right-eye display panels 18L and 18R and between the wide viewing angle optical systems 31L and 31R. The left-eye image and right-eye image are created according to the set convergence angle θ.

In the head-mounted display 10 in which organic EL devices of high resolution used as the left-eye and right-eye display panels 18L and 18R are combined with multi-channel headphones, the same realism as in a movie theater can be reproduced.

Figure 5:
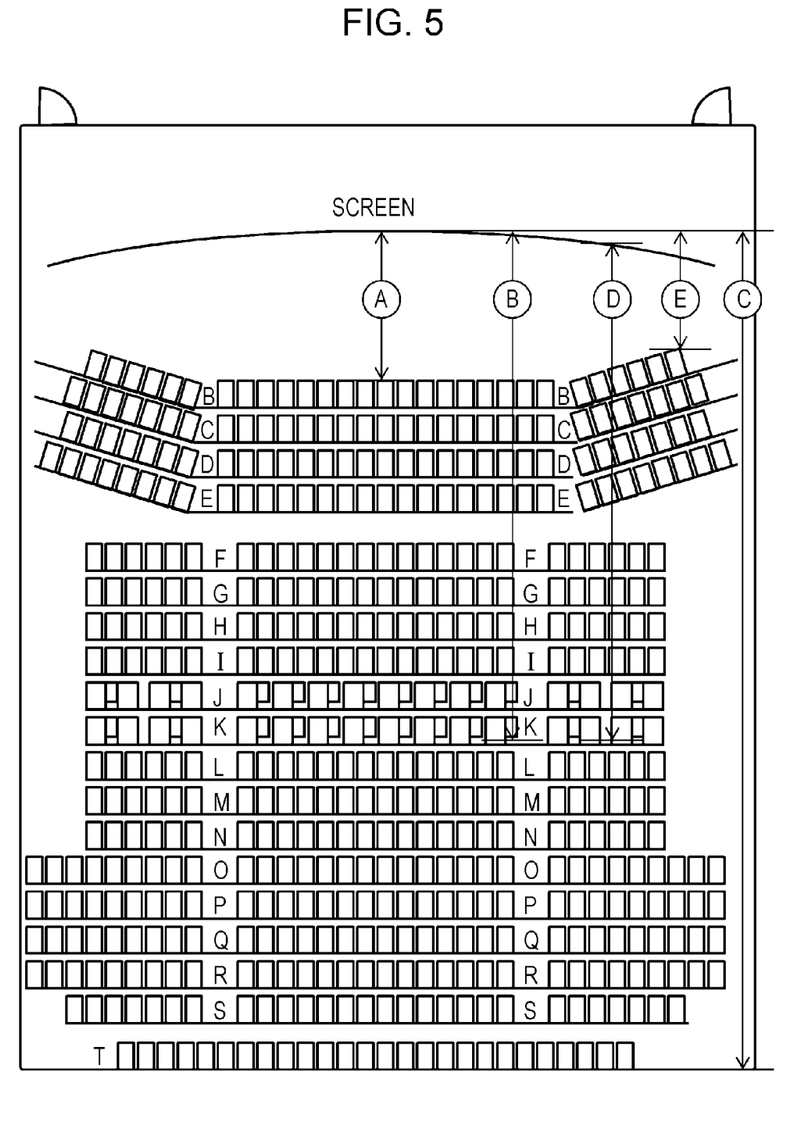
FIG. 5 shows an example of the internal structure of a movie theater.

FIG. 5 shows an example of the internal structure of a movie theater. In the movie theater shown in FIG. 5, 19 rows of seats including rows B to E, rows F to S, and row T (backmost row) are arranged in total. The seats included in rows K and J are premium seats.

In FIG. 5, the screen width is 16.5 meters. When the aspect ratio is corrected to 16 to 9, the screen width is 16.5 meters, the height is 9.3 meters, and the image size is 745.3 inches.

The distance from each seat to the screen is shown in Table 1 below.

TABLE 1

| Sheet location | Symbol | Distance [m] |
| --- | --- | --- |
| Front row to screen center | A | 4.25 |
| Premium seat (row K) to screen center | B | 17 |
| Back row to screen center | C | 26.5 |
| Front seat in front row to screen center | E | 2.53 |
| Premium seat (row K) to screen in vertical direction | D | 16.5 |

The angles of view in seats in rows J, K, L, M, N, O, P, and T are calculated as shown in Table 2. Here, the angles of view are calculated in the center position of the screen.

TABLE 2

| Seat position | Distance [m] | Angle of view [deg] |
| --- | --- | --- |
| J | 15.7 | 55.4 |
| K | 17.0 | 51.8 |
| L | 18.1 | 49.0 |
| M | 19.2 | 46.5 |
| N | 20.3 | 44.2 |
| O | 21.4 | 42.2 |
| P | 22.5 | 40.3 |
| T | 26.5 | 35 |

The angles of view for the premium seats included in rows J and K are 50 to 55 degrees, which are too large for the optimum environment. For example, when the user reads a caption near an end of the screen, he or she should move the face and becomes tired in the neck. This situation is not appropriate for video appreciation. The inventors consider that the premium seats are suited for audio appreciation rather than video appreciation in that the premium seats do not have best angles of view for the screen.

The inventors also consider that the angle of view suited for viewing a video image without tiredness in the neck is smaller than 55 degrees and is preferably around 45 degrees. If this angle is applied to the movie theater shown in FIG. 5, it can be seen from Table 2 above that the seats near row N have an angle of view of 45 degrees. In consideration of the distance from a seat in row N to the screen center, reproducing an angle of view of 45 degrees in the movie theater is equivalent to focusing an approximately 750-inch virtual image 20 meters away from the user's eye on the retina.

TABLE 3

| Screen size [inch] | 750 |
| --- | --- |
| Width [m] | 16.6 |
| Distance [m] | 20.0 |
| Angle of view [deg] | 45.09 |

When only the angle of view is taken into consideration, if an approximately 300-inch virtual image several meters away is focused on the retina, the angle of view becomes approximately 45 degrees, which is almost the same as above. When a 3D video image whose left and right images have parallax is displayed, if a longer distance is taken for the same angle of view, the video image is provided with depth on the far side to produce natural stereoscopic effects. In this embodiment, use of a wide viewing angle optical system for each of the left-eye and right-eye display panels 18L and 18R makes the distance longer for the same angle of view.

Figure 6:
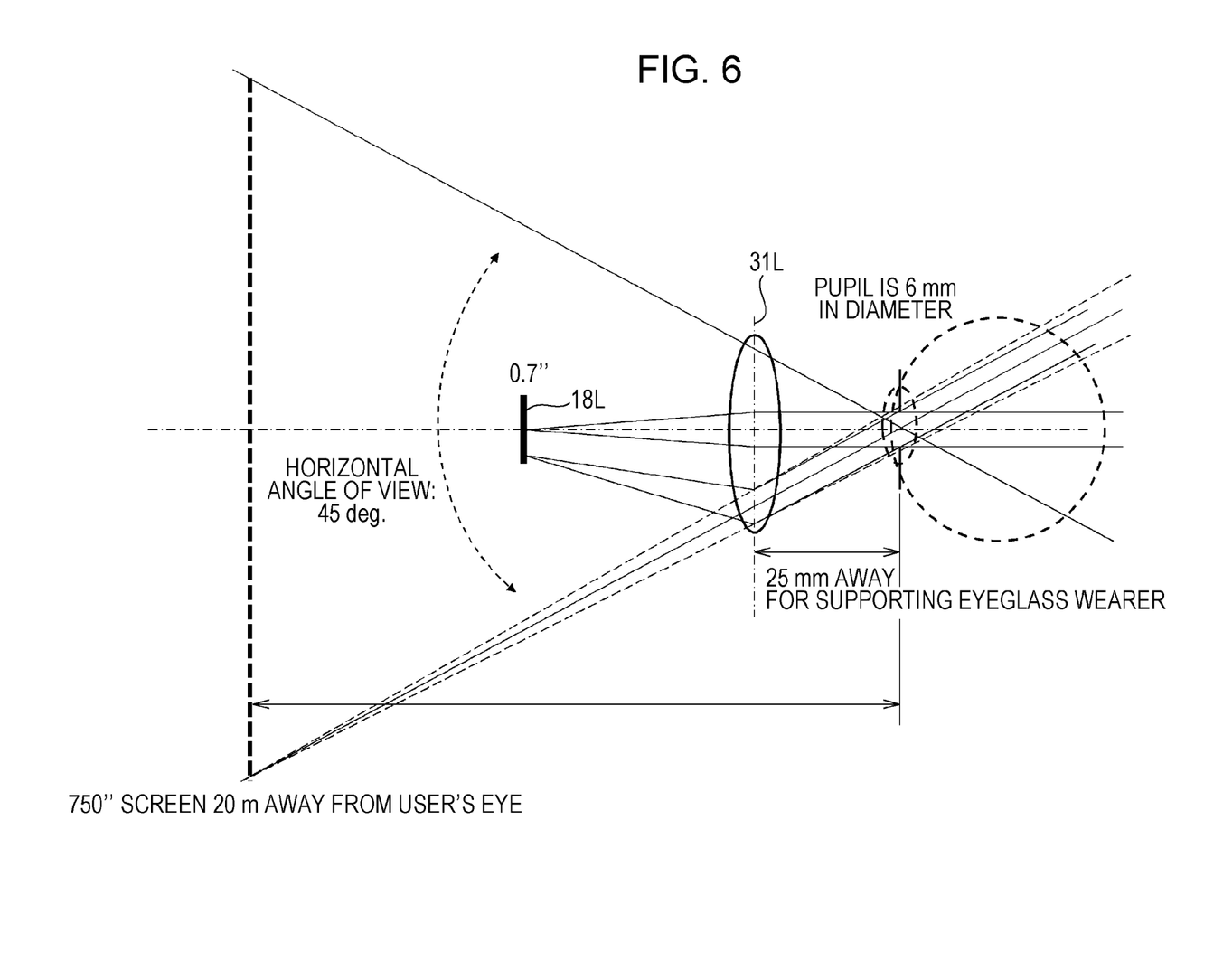
FIG. 6 shows an example of the arrangement of a wide viewing angle optical system and a display panel in which an approximately 750-inch virtual image 20 meters away from the user's eyes is focused on the retina.

FIG. 6 shows an example of the arrangement of the wide viewing angle optical system 31L (31R) and the display panel 18R (18L) by which an approximately 750-inch virtual image at 20 meters away from the user's eyes is focused on the retina, or an angle of view of 45 degrees in a movie theater is reproduced.

Generally, pupils open or close in a range from 2 to 6 millimeters. When the user wearing the head-mounted display 10 observes a video image, the pupils close to approximately 2 to 3 millimeters in a bright scene and open to approximately 5 to 6 millimeters in a dark scene. The dark scene is a scene in which, for example, only text is displayed in a dark background.

The wide viewing angle optical system 31L is placed 25 millimeters away from the pupil. The left-eye display panel 18L is placed ahead of the wide viewing angle optical system 31L and has an effective pixel range of approximately 0.7 inches. In the wide viewing angle optical system 31L, an approximately 750-inch virtual image 20 meters away from the user's eye is focused on the retina. This is equivalent to a horizontal angle of view of 45.09 degrees for display pixels (described above). According to the example of the arrangement shown in FIG. 6, the display image of the left-eye display panel 18L is magnified 1000 or more times by the wide viewing angle optical system 31L to focus the virtual image on the retina. The main specifications of the wide viewing angle optical system 31L (31R) are summarized in the following table.

TABLE 4

| Item | Specification | Remark |
|---|---|---|
| Screen size of virtual image | 750 inch @ 20 m | 750" display of display pixels 20 m away |
| Horizontal angle of view | 45.09 [deg] | Horizontal angle of view of display pixels |
| Display panel size | Approx. 0.7" | Effective pixel range |
| Set eyeball diameter and movable range | 6 mm XY direction: ±3 mm Tilt angle: up to maximum height | Tilt turn radius is half the focal length of an eyeball |

Figure 7:
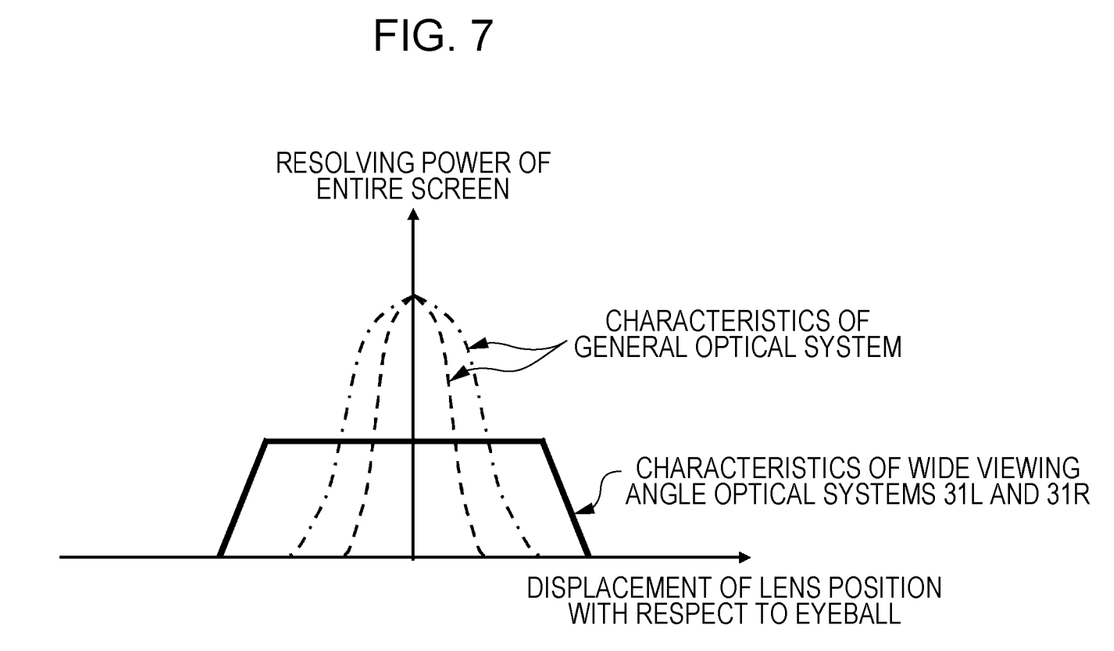
FIG. 7 shows the characteristics of revolving power of the wide viewing angle optical system.

Here, "Set eyeball diameter and movable range" in Table 4 will be additionally described. An optical system is generally designed so that the resolving power has a peak at the center of the lens. Because the user makes observation with his or her pupils aligned with the centers of lenses. On the other hand, in the wide viewing angle optical system 31L (31R) included in the head-mounted display 10, the point to be seen moves from the center of the screen to the periphery depending on the scene. Even when the wide viewing angle optical system 31L (31R) is disposed on the basis of the positions of pupils when the user faces the front, if the point to be seen changes, the eyeball turns and the position of the pupil is displaced from the center of the wide viewing angle optical system 31L (31R). If the peak of resolving power is present at the center of the lens (see examples 1 and 2 in FIG. 7), the periphery of the image is blurred during observation. On the basis of measurement results, the inventors confirmed that the position of the pupil was displaced approximately ±3 millimeters from the center of the wide viewing angle optical system 31L (31R) during observation of a virtual image with an angle of view of 45 degrees. Accordingly, in this embodiment, the wide viewing angle optical system 31L (31R) is designed so as to keep substantially even resolving power in a range of ±3 millimeters from the center (see FIG. 7).

The head-mounted display 10 according to the embodiment magnifies the display video image on the display panel 18L (18R) 1000 or more times by taking a distance of 20 meters at an angle of view of 45 degrees. As a result, the video image is provided with increased depth and natural stereoscopic effects (described above). The relationship between the magnification ratio of the screen size and the depth will be described with reference to FIGS. 8 and 9.

Figure 8:
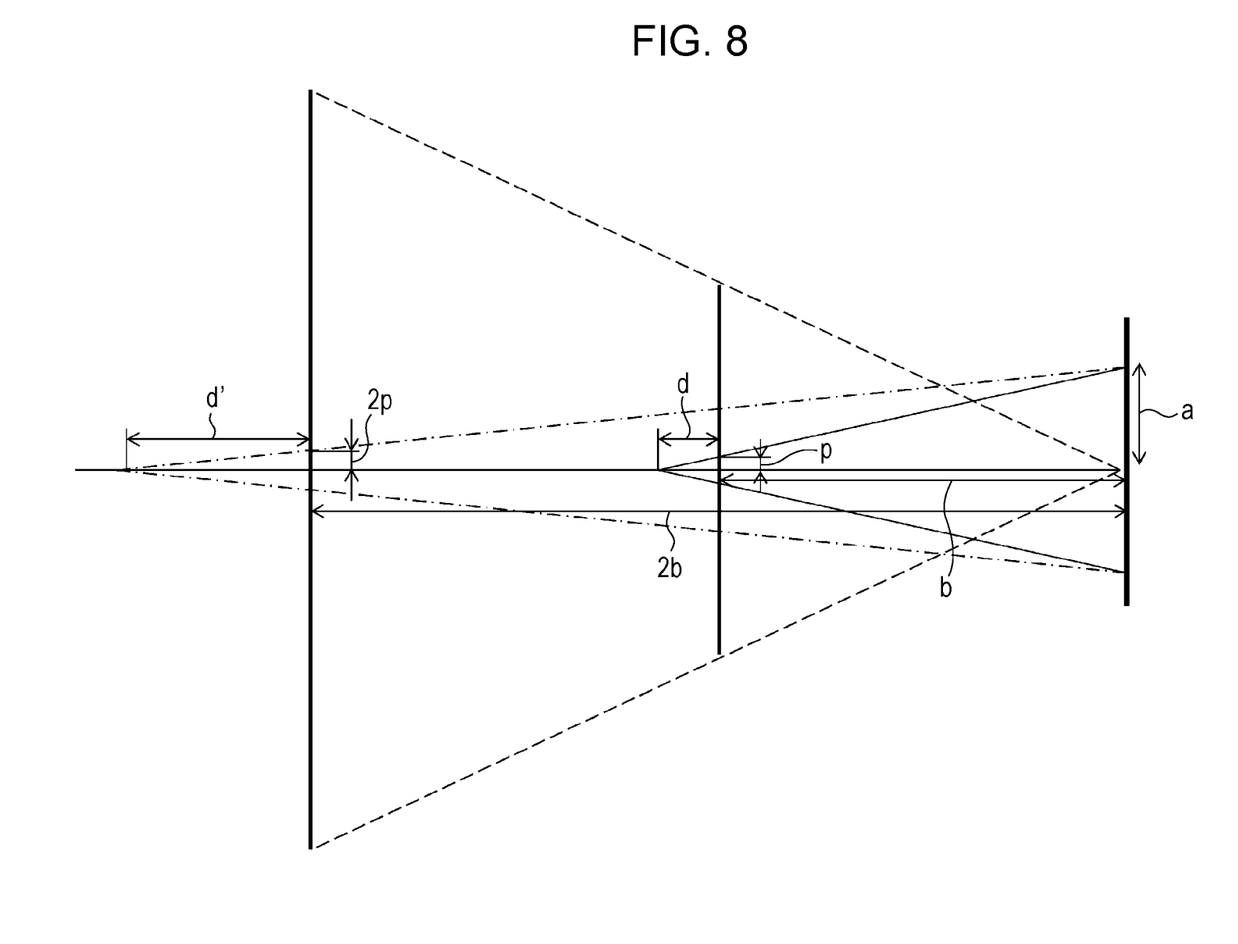
FIG. 8 shows the relationship between the magnification ratio of a screen size and the depth (when the screen size is doubled).

FIG. 8 shows an example in which the head-mounted display 10 magnifies the screen size twice. In FIG. 8, the value half the interpupillary distance is a, the distance of sight of the display panel 18L (18R) is b (the value double the distance of sight to the screen is 2b), the depth at the position of the display panel 18L (18R) is d, the depth of the doubled screen is d', and the value half the parallax at the position of the display panel 18L (18R) is p (the value half the parallax of the doubled screen is 2p).

The ratio of p, which is half the parallax, to depth d is geometrically found to be equal to the ratio of (a−p) to distance of sight b. The ratio of 2p, which is half the parallax of the doubled screen, to depth d', which is the depth of the doubled screen, is geometrically found to be equal to the ratio of (a−2p) to doubled distance of sight 2b. Accordingly, when the screen size is doubled and the parallax is doubled (with the same distance of sight/screen size), the depth normalized by the eye size is given by the following expressions.

$$p/d = (a-p)/b$$

$$2p/d' = (a-2p)/2b$$

$$d'/d = 4(a-p)/(a-2p)$$

$$(d'/2)/d = 2(a-p)/(a-2p)$$

Figure 9:
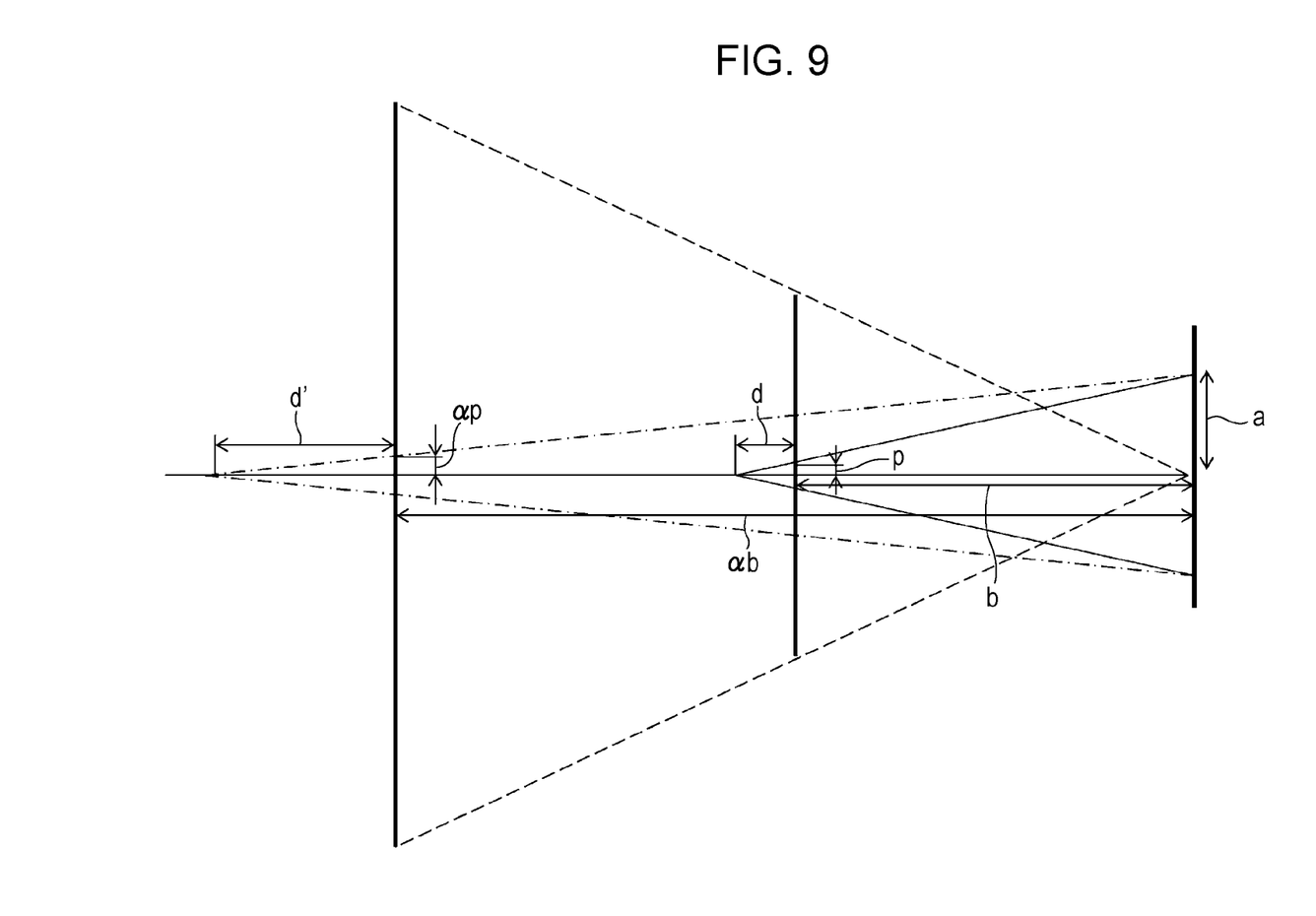
FIG. 9 shows the relationship between the magnification ratio of the screen size and the depth (when the screen size is magnified $\alpha$ times).

FIG. 9 shows an example in which the head-mounted display 10 magnifies the screen size a times. In FIG. 9, the value half the interpupillary distance is a, the distance of sight of the display panel 18L (18R) is b (the distance of sight to the screen magnified α times is αb), the depth at the position of the display panel 18L (18R) is d, the depth of the screen magnified α times is d', and the value half the parallax at the position of the display panel 18L (18R) is p (the value half the parallax of the screen magnified α times is αp).

The ratio of p, which is half the parallax, to depth d is equal to the ratio of (a−p) to distance of sight b (same as above). The ratio of αp, which is half the parallax of the screen magnified α times, to depth d', which is the depth of the screen magnified α times, is geometrically found to be equal to the ratio of (a−2α) to distance of sight αb, which is the distance of site magnified α times. Accordingly, when the screen size is magnified α times and the parallax is magnified α times (with the same distance of sight/screen size), the depth normalized by the eye size is given by the following expressions.

$$p/d = (a-p)/b$$

$$p/d = (a-p)/2b$$

$$\alpha p/d' = (a-\alpha p)/\alpha b$$

$$(d'/\alpha)/d = \alpha(a-p)/(a-\alpha p) > \alpha$$

It can be seen from the above expressions that, when the distance is longer and the magnification ratio α of the screen size is larger at the same angle of view, the depth increases.

The left-eye image information and the right-eye image information from which a stereoscopic image is sourced are created in consideration of a predetermined convergence angle. The head-mounted display 10 displays the left-eye image and the right-eye image on separate screens so that the user's eyes can see a stereoscopic video image by synthesizing both screens (see the description above and FIG. 4).

Figure 10:
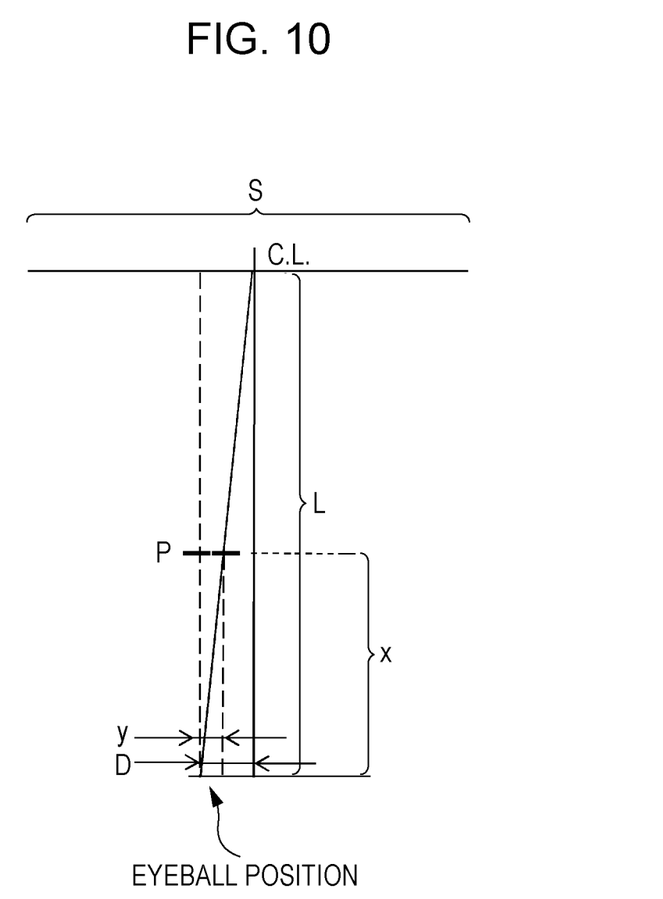
FIG. 10 shows the arrangement of the display panel in a location displaced by a convergence horizontal offset from the position of a left eyeball.

The eyes of the user seeing a video image of the head-mounted display 10 approach each other depending on the angle of view to obtain the appropriate parallax. In this embodiment, the horizontal location of the display panel 18L (18R) is displaced from the position of the eyeball by an offset (referred to below as the convergence horizontal offset) that depends on the approximation of both eyes, that is, convergence. FIG. 10 shows the arrangement of the display panel 18L in a location displaced by the convergence horizontal offset from the position of the left eyeball.

In FIG. 10, the convergence horizontal offset y can be obtained by the following expressions where the maximum interpupillary distance is D, the convergence horizontal offset is y, the size of the left-eye display panel 18L is p (0.7 inches in this embodiment), the distance of sight to the screen is L (20 meters in this embodiment), the screen size is S (750 inches in this embodiment), and the distance of sight to the left-eye display panel 18L is x.

$$D/2:L = y:x$$

$$x = P/S \times L$$

$$\rightarrow D/2:L = y:P/S \times L$$

$$\rightarrow D/2 \times (P/S \times L) \times L = D/2 \times P/S$$

As shown in the above expressions, convergence horizontal offset y depends on the maximum interpupillary distance D and the ratio of size p of the left-eye display panel 18L to size S of a surface on which a virtual image is focused, that is, the size of the screen; convergence horizontal offset y does not depend on distance L to the focus position of the virtual image. Although not illustrated, the right-eye display panel 18R is also disposed in a location displaced by the convergence horizontal offset from the position of the eyeball.

If there is a large positional difference between the left-eye and right-eye display panel 18L and 18R and their corresponding wide viewing angle optical systems, image quality may be degraded due to the displacement of convergence or eye strain may increase. Accordingly, in this embodiment, the head-mounted display 10 is mounted with a positional accuracy of several pixels (tens of microns) with respect to a predetermined convergence horizontal offset y.

It should be understood by those skilled in the art that various modifications, combinations, sub-combinations and alterations may occur depending on design requirements and other factors insofar as they are within the scope of the appended claims or the equivalents thereof.

What is claimed is:

1. A head-mounted display, comprising:
   a left-eye display panel that displays a left-eye image;
   a left-eye optical system that has a horizontal angle of view from 45 to 55 degrees and forms a virtual image of the left-eye image;
   a right-eye display panel that displays a right-eye image;
   a right-eye optical system that has a horizontal angle of view from 45 to 55 degrees and forms a virtual image of the right-eye image; and
   a display control unit that controls the screen display of the left-eye display panel and the right-eye display panel.

2. The head-mounted display according to claim 1, wherein
   the left-eye optical system forms a magnified virtual image of the left-eye image 10 meters or more away from a left eye, and
   the right-eye optical system forms a magnified virtual image of the right-eye image 10 meters or more away from a right eye.

3. The head-mounted display according to claim 1, wherein each of the left-eye optical system and the right-eye optical system has even resolving power in a range of displacement with respect to corresponding eyeballs.

4. The head-mounted display according to claim 1, wherein
   the left-eye display panel is disposed in a location displaced by a predetermined convergence horizontal offset from the position of a left eyeball, and
   the right-eye display panel is disposed in a location displaced by the predetermined convergence horizontal offset from the position of a right eyeball.

5. The head-mounted display according to claim 4, wherein the predetermined convergence horizontal offset is set on the basis of a maximum interpupillary distance and the ratio of the size of the left-eye display panel and the right-eye display panel to the size of a surface on which the virtual image is focused.

6. The head-mounted display according to claim 5, wherein the left-eye display panel is disposed in the location displaced by the predetermined convergence horizontal offset and the right-eye display panel is disposed in the location displaced by the predetermined convergence horizontal offset with a positional accuracy of several microns or less.

7. A head-mounted display, comprising:
   a left-eye display panel that displays a left-eye image;
   a left-eye optical system that has an angle of view from 45 to 55 degrees and forms a virtual image of the left-eye image;
   a right-eye display panel that displays a right-eye image;
   a right-eye optical system that has an angle of view from 45 to 55 degrees and forms a virtual image of the right-eye image; and
   a display control unit that controls the screen display of the left-eye display panel and the right-eye display panel,
   wherein the left-eye display panel is disposed in a location displaced by a predetermined convergence horizontal offset from the position of a left eyeball, and the right-eye display panel is disposed in a location displaced by the predetermined convergence horizontal offset from the position of a right eyeball,
   and wherein the predetermined convergence horizontal offset is set on the basis of a maximum interpupillary distance and the ratio of the size of the left-eye display panel and the right-eye display panel to the size of a surface on which the virtual image is focused.

8. The head-mounted display according to claim 7, wherein the left-eye display panel is disposed in the location displaced by the predetermined convergence horizontal offset and the right-eye display panel is disposed in the location displaced by the predetermined convergence horizontal offset with a positional accuracy of several microns or less.

* * * * *